United States Patent
Rahmathullah et al.

(10) Patent No.: US 8,992,650 B2
(45) Date of Patent: Mar. 31, 2015

(54) AIR FILTER WITH TENSILE SUPPORT MEMBER

(71) Applicant: AAF-McQuay Inc., Louisville, KY (US)

(72) Inventors: M. Aflal Rahmathullah, Louisville, KY (US); Scott Mineart, Westfield, IN (US); Greg Clements, Prospect, KY (US); Michael Montague, Louisville, KY (US); Rodger E. Stowe, Avon, IN (US)

(73) Assignee: American Air Filter Company, Inc., Louisville, KY (US)

( * ) Notice: Subject to any disclaimer, the term of this patent is extended or adjusted under 35 U.S.C. 154(b) by 43 days.

(21) Appl. No.: 13/656,488

(22) Filed: Oct. 19, 2012

(65) Prior Publication Data

US 2014/0109534 A1    Apr. 24, 2014

(51) Int. Cl.
*B01D 39/00* (2006.01)
*B01D 46/00* (2006.01)
*B01D 46/10* (2006.01)
*B01D 46/52* (2006.01)

(52) U.S. Cl.
CPC ........ *B01D 46/0002* (2013.01); *B01D 46/0016* (2013.01); *B01D 46/10* (2013.01); *B01D 46/521* (2013.01); *B01D 46/0005* (2013.01); *B01D 2265/06* (2013.01); *B01D 2275/203* (2013.01)
USPC .................. 55/499; 55/495; 55/497; 55/501; 55/511

(58) Field of Classification Search
CPC .. B01D 46/10; B01D 46/523; B01D 39/1623; F02M 35/04; A62B 23/02
USPC ........... 55/495, 497, 499, 501, 504, 511, 521, 55/DIG. 35
See application file for complete search history.

(56) References Cited

U.S. PATENT DOCUMENTS

| | | | |
|---|---|---|---|
| 6,074,450 A * | 6/2000 | Raber | 55/497 |
| 7,537,632 B2 * | 5/2009 | Miller et al. | 55/501 |
| 2005/0039427 A1 | 2/2005 | Karlsson | |
| 2005/0138906 A1 * | 6/2005 | Kubokawa et al. | 55/497 |

FOREIGN PATENT DOCUMENTS

WO    2007149899    12/2007

* cited by examiner

*Primary Examiner* — Jason M Greene
*Assistant Examiner* — Karla Hawkins
(74) *Attorney, Agent, or Firm* — Middleton Reutlinger; John F. Salazar; Chad D. Bruggeman (57) ABSTRACT

An apparatus and method for an air filter media and frame having structural support members, including a tensile support member.

20 Claims, 3 Drawing Sheets

AIR FILTER WITH TENSILE SUPPORT MEMBER

CROSS-REFERENCE TO RELATED DOCUMENTS

None.

TECHNICAL FIELD

The invention relates generally to an apparatus for filtering particulates from a stream of air. More specifically, the invention relates to an air filter having an improved support structure to increase resistance to deformation.

BACKGROUND

It is desirable to provide filter media in certain streams of air to remove particulates from streams of air because such particulates can cause damage to equipment, for example, HVAC equipment. It is further desirable to provide filtering media that is efficient, has a long operating life, and has consistent operating characteristics.

It is common in the art to use a filtering media that may be made of any of a variety of materials, including, for example, media made primarily of non-woven cotton-polyester fiber blends. However, non-woven cotton-polyester fiber blends have inherent variability in performance, primarily due to the inconsistency of the fiber diameter in these blends. Additionally, more inconsistency is introduced by additives such as tackifiers or binder agents, which are often used with cotton-polyester fiber blends to increase filter efficiency, because these additives tend to build up in some areas.

One means to combat this inconsistency is to use as a filtering media non-woven blends based on polyester or polyethylene virgin fibers. The increased consistency when using blends based on polyester or polyethylene virgin fibers results primarily from the ability to manufacture these fibers with relatively low variation in diameter from fiber to fiber, as well as from the fact that these blends are effective without additional tackifiers or binder agents. However, filtering media composed primarily of polyester or polyethylene virgin fibers tends to be stiffer than filtering media using cotton-polyester fiber blends. This stiffness can create a problem in filters utilizing a cardboard frame.

It is common in the art to use cardboard frames to provide structural support for the filtering media. Such frames often form a perimeter around the filtering media and include a plurality of support trusses. Angled trusses transfer tension from the top and bottom sides of the frame perimeter to the left and right sides of the frame perimeter. These angled trusses also help resist torsion of the frame. During assembly, frames may be stretched to accept the filtering media. If the media is too stiff it may overcome the yield point of the frame and cause deformation of the frame. Such deformation may prevent the frame from returning to its original shape. This inability of the frame to return to its original shape is especially prevalent when materials such as cardboard or beverage board are used to construct the frame. The deformation causes tension in the truss members, which in turn pulls the left and right sides of the frame inwardly. The deformation of the frame may cause bowing. This bowing is problematic, especially where filters are placed side by side in operation, because bowing of the frame creates gaps through which air can flow unfiltered.

One solution to the problem of frame deformation is to use a more rigid frame. Plastics or metals, for example, may be used to construct the frame and thereby increase its rigidity. However, these materials are prohibitively expensive in comparison to cardboard and other materials.

Thus, it would be highly desirable to use a stiffened filtering media made of, for example, polyester or polyethylene virgin fibers, contained within a cardboard, or similar, frame that has increased resistance to deformation.

SUMMARY

The present disclosure is directed towards inventive methods and apparatus for an air filter with one or more tensile support members. The air filter with tensile support member is, in various embodiments, a frame around an outer perimeter of a filter media that also includes a plurality of structural support members extending across the front and/or back faces of the filter media. The air filter with tensile support member may also include a media backing structure for, among other things, maintaining a shape or orientation of the filter media. The plurality of structural support members may include one or more tensile support members that enhance the rigidity of the frame, thus aiding in the ability of the frame to resist deformation.

Generally, in one aspect, an air filter with tensile support member is provided for filtering a stream of air and having improved structural rigidity. The air filter with improved tensile support includes a pleated filter media having a stiffness of at least about 600 Gurley and having a machine direction and a transverse direction that is transverse to the machine direction, thus defining a first plane that is transverse to the flow of the stream of air. The pleated filter media has pleat valleys, extending from the top to the bottom of the filter media that are continuous and substantially uninterrupted from top to bottom. The air filter further includes a frame having one or more frame members that have an inner perimeter for accepting an outer perimeter of the filter media, a frame front surface, a frame rear surface, and a plurality of structural support members. The filter media has a width in the transverse direction that is wider than a width of the inner perimeter of the frame in the transverse direction. The frame front and/or rear surfaces include a plurality of angled support members as well as one or more tensile support members to enhance the structural rigidity of the frame. The tensile support member or members extend in the transverse direction. The filter media is interposed between the frame front and rear surfaces.

In some embodiments, the plurality of structural support members includes a second tensile support member extending in the machine direction.

In some embodiments, there is a media backing structure interposed between the filter media and the frame.

In some embodiments, the frame front surface overlaps the frame rear surface.

In some embodiments, the filter media is made of polyester fibers.

In some embodiments, the filter media is made of polyethylene fibers.

In some embodiments, the frame is constructed of cardboard.

Generally, in another aspect, an air filter with tensile support member is provided which includes a frame having a front frame surface with an opening and a rear frame surface also having an opening. In this aspect, also included is a pleated filter media having a stiffness of at least about 600 Gurley retained within the frame. The filter media extends in a transverse direction from its top to its bottom and has a plurality of pleat valleys also extending from top to bottom continuously and substantially uninterrupted. The filter media has a length from top to bottom that is greater than a length of the frame from top to bottom. One of the front frame surface and rear frame surface has at least one tensile support member and a plurality of angled support members. The at least one tensile support member extends substantially parallel to the transverse direction across an air flow opening, and the plurality of angled supports are angled substantially equally relative to the at least one tensile support member.

In some embodiments, there is also included a media backing structure interposed between the filter media and the frame.

In some embodiments, the frame front surface overlaps the frame rear surface.

In some embodiments, the frame rear surface overlaps the frame front surface.

In some embodiments, the pleated filter media is formed of polyester fibers.

In some embodiments, the pleated filter media is formed of polyethylene fibers.

In some embodiments, the frame is constructed of cardboard.

In another aspect, a method is detailed for forming an air filter with improved tensile support. The method includes providing a frame rear having an outer perimeter and a plurality of angled support members and one or more tensile support members, as well as providing a frame front having an outer perimeter. The method also includes applying an adhesive to the frame rear and inserting a filter media having a stiffness of at least about 600 Gurley into the frame rear so that the filter media contacts the adhesive, then stretching the frame front and/or the frame rear, and attaching one or more attachment members of the frame front to one or more attachment members of the frame rear.

In some embodiments, the frame front also has a plurality of angled support members angled relative to the tensile support member or members.

In some embodiments, the method also includes providing a media backing structure interposed between the filter media and the frame.

BRIEF DESCRIPTION OF THE ILLUSTRATIONS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the term "attached" and variations thereof herein are used broadly and encompass direct and indirect connections, couplings, and mountings. In addition, the term "attached" and variations thereof are not restricted to physical or mechanical connections or couplings.

Figure 1:
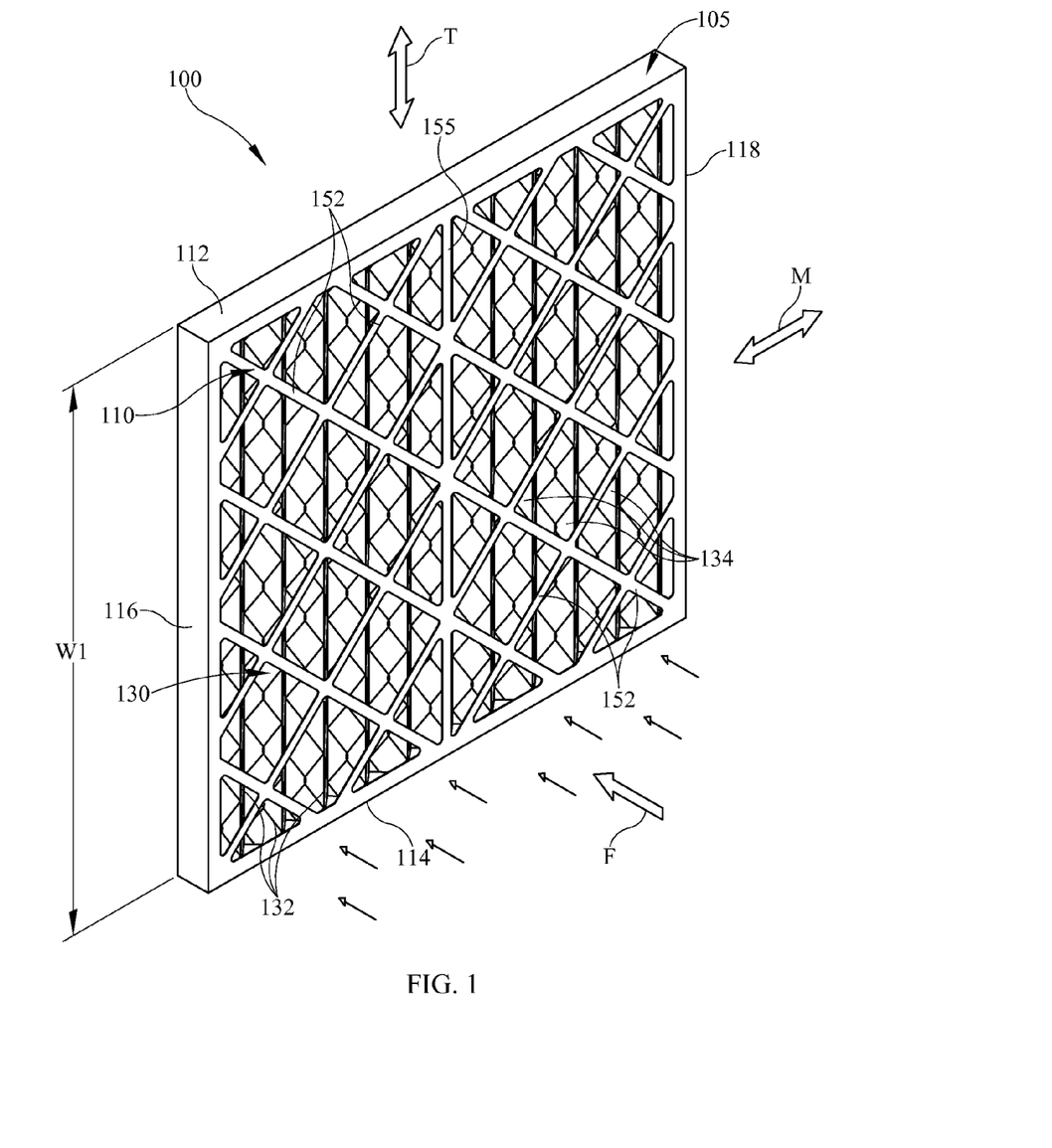
FIG. 1 depicts a perspective view of an embodiment of an air filter with tensile support member.
Figure 2:
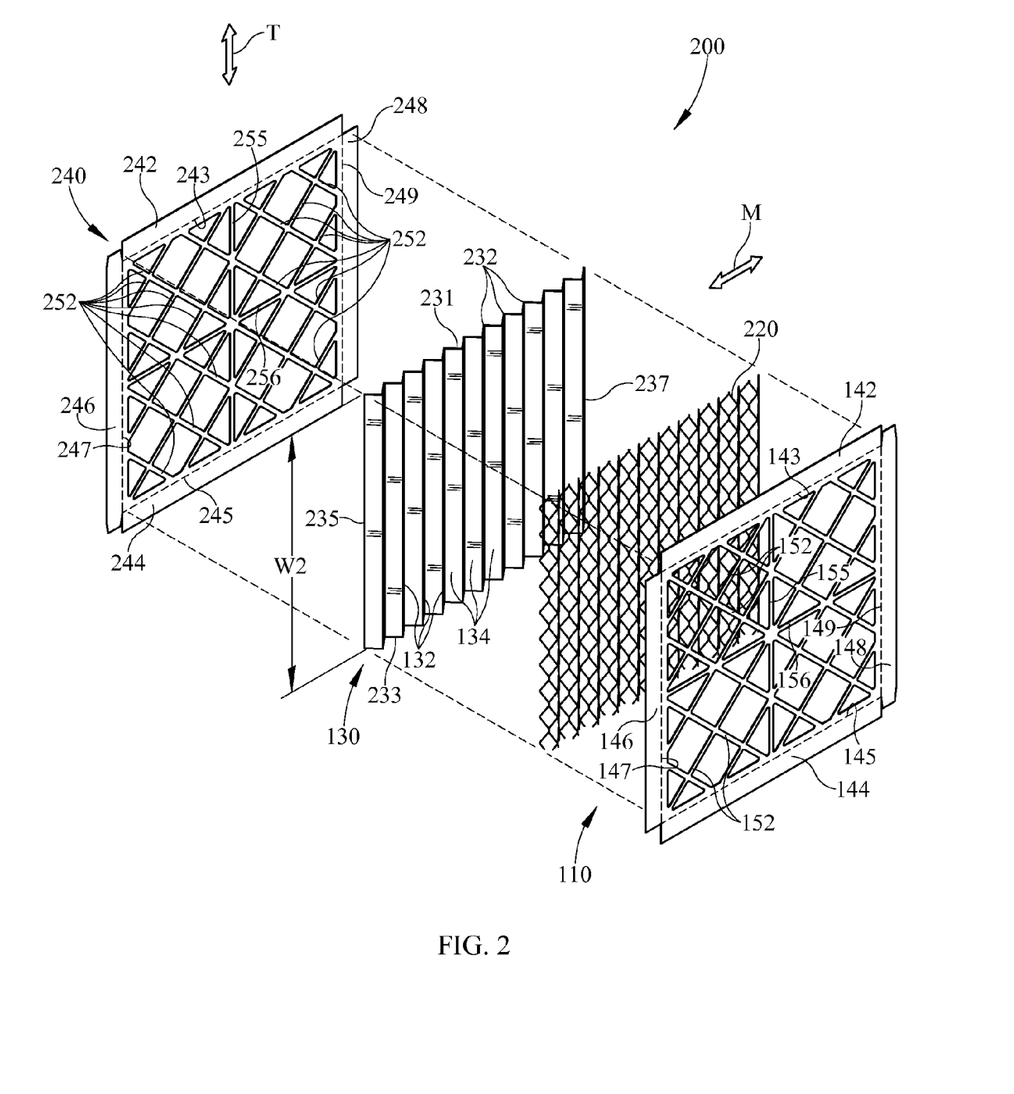
FIG. 2 depicts an exploded assembly view of another embodiment of an air filter with tensile support members.

Referring initially to FIG. 1, an embodiment of an assembled air filter 100 with a tensile support member 155 is shown having a frame 105 framing a filter media 130. The frame 105 includes a frame front 110, a frame top member 112, a frame bottom member 114, a frame first side member 116, a frame second side member 118, a plurality of front angled support members 152, and the front tensile support member 155. The frame top member 112, the frame second side member 118, the frame bottom member 114, and the frame first side member 116 form an inner perimeter. This inner perimeter has an inner-frame width W1 in a first, or transverse, direction T. The term "width" as used herein is used as a measurement of distance from top to bottom, or from side to side, whichever is being referenced. Referring now to FIG. 2, an embodiment of an unassembled air filter 200 with tensile support members 155, 156, 255, 256 is depicted having a front top attachment member 142 that may be folded about a front top score 143 toward a frame rear 240 until the front top attachment member 142 is substantially perpendicular to the frame front 110. A rear top attachment member 242 may be folded about a rear top score 243 toward the frame front 110 until the rear top attachment member 242 is substantially perpendicular to the frame rear 240. Thus, the front top attachment member 142 and the rear top attachment member 242 may be attached and/or assembled to form the frame top member 112 depicted in FIG. 1. Similarly, a front bottom attachment member 144, a front first side attachment member 146, and a front second side attachment member 148 may be folded about respective front scores 145, 147, 149. A rear bottom attachment member 244, a rear first side attachment member 246, and a rear second side attachment member 248 may be folded about respective rear scores 245, 247, 249 so that the bottom attachment members 144, 244 may be attached to each other, the first side attachment members 146, 246 may be attached to each other, and the second side attachment members 148, 248 may be attached to each other, thereby forming the frame bottom 144 and other frame sides 116, 118 depicted in FIG. 1. In this embodiment, the frame front 110 is substantially planar and includes the plurality of front angled support members 152 and the front tensile support members 155, 156. Each of the frame top member 112, the frame bottom member 114, the frame first side member 116, and the frame second side member 118 are substantially planar and oriented in FIG. 1 such that each of the side members 112, 114, 116, 118 are substantially perpendicular to the frame front 110. Similarly, the frame 105 includes a frame rear 240 (see FIG. 2) that is substantially planar and substantially parallel to the frame front 110 and, although not shown in FIG. 1, substantially perpendicular to the side members 112, 114, 116, 118. The frame rear 240 includes a plurality of rear angled support members 252 and rear tensile support members 255, 256. The angled support members 152, 252 are depicted in this embodiment as extending at approximately a 45 degree angle relative to the transverse direction T and/or a second, or machine, direction M. It is understood however, that angled support members 152, 252 may extend at any angle relative to said the transverse direction T and/or machine direction M and need not be symmetric.

Figure 3A:
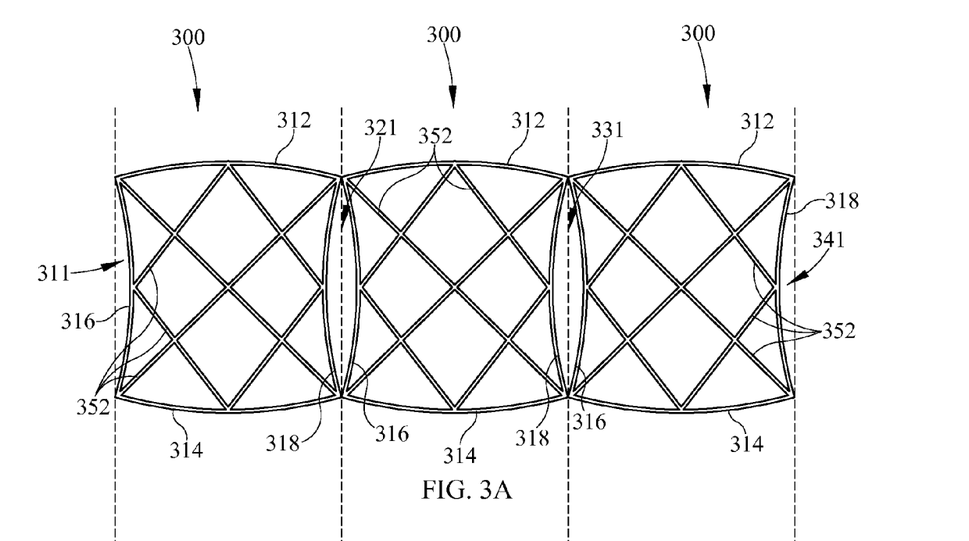
FIG. 3A depicts a front view of multiple air filters arranged side by side, each without tensile support members.
Figure 3B:
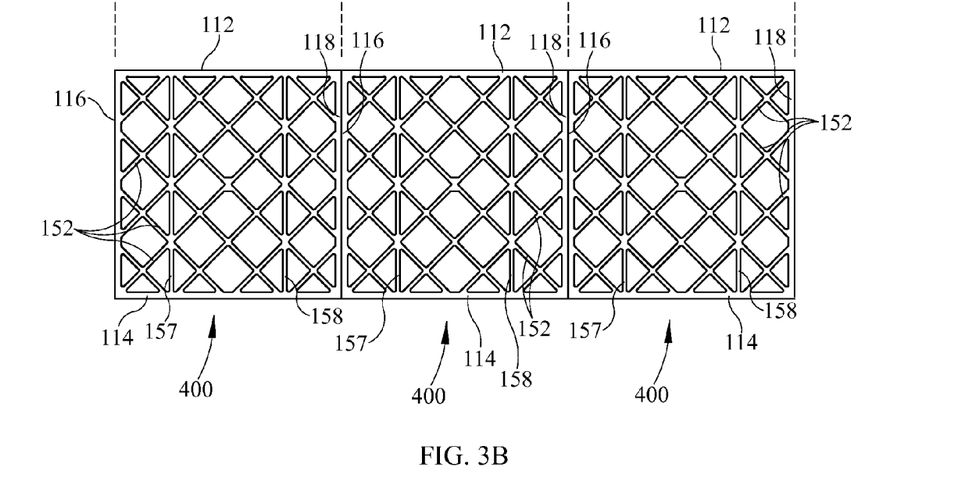
FIG. 3B depicts a front view of an embodiment of multiple air filters arranged side by side, each having tensile support members.

Referring now to FIGS. 1 and 2, the filter media 130 is illustrated as substantially pleated, having a plurality of pleat tips 132 that are substantially coplanar and a plurality of pleats 134 that are "fan folded" or "accordion folded." The plurality of pleats 134 are arranged side by side in the machine direction M and each pleat 134 extends in the transverse direction T, which, in this embodiment, is substantially perpendicular to the machine direction M. The plurality of pleats 134 extend in the machine direction M from the frame first side member 116 to the frame second side member 118, and each pleat 134 extends in the transverse direction T from a filter media top 231 to a filter media bottom 233. The plurality of pleats 134 form a plurality of pleat valleys that continue substantially uninterrupted from a filter media top 231 to a filter media bottom 233. This uninterrupted disposition of pleat valleys allows for even pressure distribution across the face of the filter media 130 and/or reduces pressure drop through the filter media 130. Also, the plurality of pleat tips 132 lie in a plane that is substantially coplanar with the frame front 110. Additionally, the filter media 130 is depicted having a filter media first side 235 and a filter media second side 237. The filter media top, bottom, and sides 231, 233, 235, 237 define a perimeter around filter media 130. A media backing structure 220 is included to help the filter media 130 maintain its shape and/or orientation. In this embodiment, the media backing structure 220 may be shaped to flushly mate with the filter media 130 and may be interposed between the filter media and the frame front 110, the frame rear 240, or both. It is further understood that, while FIGS. 1-3 illustrate the air filter 100, 200, 400 with tensile support member 155, 156, 157, 158, 255, 256 as substantially square in shape, it may be any shape, including, but not limited to, rectangular, triangular, polygonal, round, cylindrical, or any other shape. The filter media 130 has a width W2 measured in the transverse direction T from the filter media bottom 233 to the filter media top 231. Unassembled, as shown in FIG. 2, the filter media width W2 is larger than the inner-frame width W1, as shown in FIG. 1. The width W2 is slightly larger than the distance of the inner perimeter of frame front 110 and/or frame rear 240 as measured in the transverse direction T from bottom score 145, 245 to top score 143, 243. The distance of the inner perimeter of frame front 110 and/or frame rear 240 as measured in the transverse direction T may also be referred to as the inner-frame width W1. Thus, frame 105 is stretched in the transverse direction T to be assembled around filter media 130. The frame 105 may be stretched by hand as, for example, when a human operator assembles the frame 105 around the filter media 130. For example, the human operator may form three frame side members 114, 116, 118 by attaching the corresponding attachment members 144, 244, 146, 246, 148, 248, respectively, leaving the frame top member 112 temporarily unassembled. The human operator may then insert the filter media 130 into the frame 105 between the top attachment members 142, 242. When the filter media 130 is inside the frame 105, the operator may stretch by pulling in the transverse direction T the frame front 110 and the frame rear 240 until wide enough in the transverse direction T to fold and attach top attachment member 142, 242 over the filter media top 231, thus creating a friction fit of the filter media 130 inside the frame 105. It is understood that machines and/or other automated processes may be used in lieu of, or in conjunction with, manual operations to perform the stretching and/or other assembly functions. Generally, in some embodiments, the frame 105 may need to be stretched up to 0.25" in the transverse direction T away from its normal position. This stretching may be permanent if the frame 105 is not allowed to relax back, as may be the case, for example, if the filter media 130 is stiff enough to resist the frame 105 relaxing back to its normal position. However, it is understood that the presence and/or degree of stretching of frame 105 may be made permanent once the attachment members 142, 242, 144, 244, 146, 246, 148, 248 are attached together as described above.

Referring now to FIG. 2, the frame front 110 is depicted as substantially planar and includes the plurality of front angled support members 152 and two front tensile support members 155, 156. In this embodiment, the front tensile support member 155 is perpendicular to the other front tensile support member 156. Although possible that only one front tensile support member 155, 156 will be in tension in use and the other tensile support member 155, 156 will be in compression in this embodiment, inclusion of at least one tensile support member 155, 156 in each direction T, M helps, for example, to ensure that at least one tensile support member 155, 156 is oriented parallel to the transverse direction T notwithstanding operator error or other error during assembly. The frame front 110 has attached thereto a front top attachment member 142, the front bottom attachment member 144, the front first side attachment member 146, and the front second side attachment member 148. Each of the front attachment members 142, 144, 146, 148 is substantially planar and substantially coplanar with frame front 110. The frame rear 240 is substantially planar and substantially parallel to the frame front 110. The frame rear 240 includes the plurality of rear angled support members 252 and two rear tensile support members 255, 256. As with tensile support members 155, 156 in this embodiment, one tensile support member 255, 256 may be in tension while the other tensile support member 255, 256 may be in compression, for substantially the same reason as described above. The frame rear 240 has attached thereto the rear top attachment member 242, the rear bottom attachment member 244, the rear first side attachment member 246, and the rear second side attachment member 248. Each of the rear attachment members 242, 244, 246, 248 is substantially planar and substantially coplanar with frame rear 240. In this embodiment, the air filter 200 with tensile support members 155, 156, 255, 256 may be assembled including the frame front 110, the filter media 130, and the frame rear 240, as well as a media backing structure 220. The media backing structure 220 may be included to provide additional support to the filter media 130. The media backing structure 220 is depicted as a structure having a relatively high open area and may be constructed of, for example, expanded metal, a welded wire grid, chicken wire, fingers, cardboard inserts, any other metallic or non-metallic support, or other stiffening media structures as are known in the art which increase the rigidity of the pleated media. It is understood that the media backing structure 220 may be made of any of a variety of materials, or a combination thereof. It is further understood that the media backing structure 220 may be oriented in any of a variety of ways, including, but not limited to, a mesh or similar framework, and the media backing structure 220 may be oriented parallel or transverse to the transverse direction T and/or the machine direction M. In the embodiment shown in FIGS. 1-3B, the frame front 110, the filter media 130, and the frame rear 240 may be oriented in close proximity so that the pleat tips 132 of the filter media 130 are substantially coplanar with the frame front 110, and so that pleat tips 232 are substantially coplanar with the frame rear 240.

Referring again to FIGS. 1 and 2, the distance in the transverse direction T from the bottom scores 145, 245 to the top scores 143, 243 may be slightly smaller than the distance from the filter media bottom 233 to the filter media top 231, thus filter media 130 may be oversized in the transverse direction T relative to the frame members 110, 240. This oversizing allows a friction fit between the filter media 130 and the frame 105 when the front attachment members 142, 144, 146, 148 are folded and attached to the rear attachment members 242, 244, 246, 248, securing the filter media 130 in place relative to the frame 105. Additionally, adhesives may be applied to any or all of the filter media top, bottom, and sides 231, 233, 235, 237 and/or the attachment members 142, 242, 144, 244, 146, 246, 148, 248 to aid in securing the filter media 130 to the frame 130. Stretching the frame 105 in the transverse direction T creates tension in the frame 105 in the same direction. The tensile support members 155, 156, 255, 256 are oriented parallel to this tension to help the frame 105 better withstand the tension and resist deformation.

Referring now to FIGS. 3A and 3B, air filters 300, 400 are often used side-by-side in operation as depicted. Air filters 300 without tensile support members may be deformed by excessive tension in the frame resulting from the compression of the filter media 130. This deformation creates outward bowing of frame top and bottom side members 312, 314 in the transverse direction T. Angular support members 352 consequently are pulled outward in the transverse direction T and the resulting tension in the angular support members 352 pulls inwardly in the machine direction M on frame first and second side members 316, 318. The bowing depicted in FIG. 3 is not to scale, and is exaggerated to help illustrate the bowing problem. This bowing creates gaps 311, 321, 331, 341 through which air or other fluids may pass substantially unfiltered, thus diminishing the filtering capability of the air filters 300 tensile support members, especially when multiple are used side-by side. The tensile support members 157, 158 of the air filters 400 reduce the bowing by alleviating some of the tension from the angular support members 152. Reducing the amount of tension in the transverse direction T imposed on the angled support members 152 consequently reduces the amount of tension translated to the first and second side members 116, 118, thus reducing or diminishing the existence of gaps and improving the filtering efficiency when utilizing the air filters 400 with tensile support members 157, 158, especially when multiple are used side-by-side.

Referring now to FIGS. 1-3, a variety of support member 152, 252, 155, 156, 157, 158, 255, 256 patterns and/or orientations are depicted. FIG. 1 illustrates an embodiment having one tensile support member 155 extending in the transverse direction T and located approximately equidistantly from frame first side member 116 and frame second side member 118. FIG. 2 illustrates an embodiment having two tensile support members 155, 156, 255, 256 on each of the frame front 110 and frame rear 240; one extending in the transverse direction T and located approximately equidistantly from frame first side members 116, 246 and frame second side members 118, 248, and the other extending in the machine direction M and located approximately equidistantly from frame top members 112, 242 and frame bottom members 114, 244. FIG. 3 illustrates an embodiment of the air filter 400 having two tensile support members 157, 158 extending in the transverse direction T, each located equidistantly from the first or second side members 116, 118, respectively, although it is understood that they not be equidistantly located from side members 116, 118. These are three examples of possible arrangements of tensile support members 155, 156, 157, 158, 255, 256 and it is understood that any of a variety of orientations may be used, including, but not limited to, using more or fewer tensile support members or changing the spacing of the tensile support members 155, 156, 157, 158, 255, 256; and it is further understood that the tensile support members 155, 156, 157, 158, 255, 256 may be other than substantially straight members as depicted in FIGS. 1-3. It is generally understood in the art that any material covering the flow passage may result in an increased pressure drop, thus it may be desirable to use relatively little material and/or relatively few tensile support members 155, 156, 157, 158, 255, 256, which may obstruct an air flow F or flow of other fluids through the air filter 100, 200, 400. However, it may be desirable to have one or more tensile support members 155, 156, 157, 158, 255, 256 extending in the transverse direction T and also one or more tensile support members 155, 156, 157, 158, 255, 256 extending in the machine direction M to facilitate assembly, as shown in FIG. 2. Including one or more tensile support members in each of the transverse direction T and the machine direction M may help avoid misaligning the tensile support members 155, 156, 255, 256 in relation to the tension in the frame 105. Although FIGS. 1-3 illustrate angled support members 152, 252 oriented approximately 45 degrees from the transverse direction T and/or the machine direction M, it is understood that the angled support members 152, 252 may be oriented at any of a variety of angles, and that each angled support member 152, 252 may be oriented at an angle different from the orientation of any other angled support member 152, 252. Further, it may be desirable to form some or all of the support members 152, 252, 155, 156, 157, 158, 255, 256 from a diecut and/or to form the frame members 110, 240 from the same or similar diecut, whereby the diecut may also include front attachment members 142, 144, 146, 148 and/or rear attachment members 242, 244, 246, 248, to reduce manufacturing and tooling costs. However, it is understood that frame front 110 and frame rear 240 need not be identical or similar, and that each may be made from a different diecut. It is also understood that one of frame front 110 and frame rear 240 may be without support members 152, 252, 155, 156, 157, 158, 255, 256. An embodiment of the air filter 100, 200, 400 may include a front frame 110 and a rear frame 240 that are have different inner and/or outer perimeters, for example, where the frame 105 employs a "pizza box" design. A pizza box design may facilitate assembly of the frame 105 when, for example, front frame 110 has a larger width in both the transverse direction T and the machine direction M than rear frame 240, and therefore may envelope rear frame 240 including rear attachment members 242, 244, 246, 248, wherein rear attachment members 242, 244, 246, 248 have been folded about rear scores 243, 245, 247, 249. Thus, the front frame 110, in this example, may overlap the rear frame 240 because the front frame 110 has a larger width in both the machine direction M and the transverse direction T. It is understood that the pizza box design may alternatively be employed by instead having the rear frame 240 overlap the front frame 110 by having the rear frame 240 have a larger width in both the machine direction M and the transverse direction T. A primary advantage of the "pizza box" design is that it reduces stress on the attachment members 142, 242, 144, 244, 146, 246, 148, 248. A primary disadvantage of the "pizza box" design is that it requires extra tooling and extra parts to make the different size diecuts.

Referring again to FIGS. 1-3, polyester or polyethylene fibers may be used to construct the filter media 130. These fibers may be virgin and/or be nonwoven. In some embodiments, it may be desirable to construct the filter media 130 from materials having enhanced operating characteristics. For example, polyester and/or polyethylene virgin fibers may be used to form a web used to construct the filter media 130. Filter media constructed of webs of polyester and/or polyethylene virgin fibers have longer life and improved consistency than other materials commonly used in the art, such as, for example, cotton-polyester fiber blends. For example, test data has shown that polyester and/or polyethylene virgin fiber filter media, having a weight of 7-14 grams per square foot and a thickness of 100-200 mils, has a higher and more consistent dust holding capacity (195 grams±20) than does a cotton-polyester blend of the same weight and thickness (120 grams±40). However, polyester and/or polyethylene virgin fiber webs may have a stiffness of at least about 600 Gurley or more, and thus can be stiffer than cotton-polyester blends. As used herein, the phrase "stiffness of at least about 600 Gurley" is understood to include stiffness of somewhat less than 600 Gurley, including 500 Gurley. It is further understood that, although reference is made to polyester and polyethylene virgin fibers, fibers other than virgin may be used. It is understood however, that any of a variety of materials may be used to construct the filter media and such materials are known to those having ordinary skill in the art. Further, the frame 105 and its component members disclosed herein may be constructed of cardboard, beverage board, paper, plastic, wood, metal, fiberglass, or any other material.

Referring again to FIGS. 1-3, the embodiments depicted of the air filter 100, 200, 400 may be formed and assembled by forming the frame front 110 and the frame rear 240 with one or more diecuts containing the desired configuration of the support members 152, 252, 155, 156, 157, 158, 255, 256 as well as the desired configuration of the attachment members 142, 144, 146, 148, 242, 244, 246, 248. An adhering portion of the frame rear 240 that will be adjacent to the filter media 130 is coated with an adhesive or similar material or device. The plurality of pleat tips 232 of filter media 130 is then aligned with the frame rear 240 as desired and brought into contact with the adhering portion thereof. An adhering portion of the frame front 110 or the frame rear 240 is coated with an adhesive or similar material or device, aligned with the filter media 130 as desired, and brought into contact with the plurality of pleat tips 132. An attachment portion of any or all of the attachment members 142, 144, 146, 148, 242, 244, 246, 248, wherein the attachment portion is on the side proximate the filtering media 130, are also coated with an adhesive or similar material or device. One adhesive demonstrating advantageous water resistance and wet tack properties is SDX-12-V8, a synthetic multi-polymer emulsion designed especially for the air filter industry. Thus, SDX-12-V8 or similar adhesives may be desirable to use for any or all adhesion of the frame 105 and/or filter media 130. Generally, application rates of between 8 and 12 wet grams per square foot will be sufficient. In any order, one of the top attachment members 142, 242, one of the bottom attachment members 144, 244, one of the first side attachment members 146, 246, and one of the second side attachment members 148, 248 may be folded toward the filtering media 130 about the corresponding score 143, 243, 145, 245, 147, 247, 149, 249, respectively, and attached to the filter media 130. The remaining unfolded attachment members 142, 242, 144, 244, 146, 246, 148, 248 may then be folded about the corresponding score 143, 243, 145, 245, 147, 247, 149, 249, respectively and attached to the corresponding attachment member 142, 242, 144, 144, 146, 246, 148, 248. Tension is introduced into the frame 105 when the attachment members 142, 242, 144, 244, 146, 246, 148, 248 are attached if the filtering media 130 is longer in the transverse direction T and/or the machine direction M than a distance measured across the inner perimeter of frame 105 in the same direction.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

We claim:

1. An air filter, comprising:
a pleated filter media having a stiffness of at least about 600 Gurley and extending in a machine direction and in a transverse direction substantially perpendicular to said machine direction,
said machine direction and said transverse direction define a first plane;
said pleated filter media extending in said transverse direction from a top to a bottom;
said pleated filter media having a plurality of pleat valleys continuing substantially uninterrupted from said pleated filter media top to said pleated filter media bottom; and
a frame having a frame first side member and an opposing frame second side member interconnected with a frame top member and an opposing frame bottom member defining an inner perimeter, a frame front surface, a frame rear surface, and a plurality of structural support members, wherein said inner perimeter of said frame has a width in said transverse direction between said frame top member and said opposing frame bottom member;
wherein said filter media has an unassembled width in said transverse direction that is wider than said width of said inner perimeter of said frame in said transverse direction;
said plurality of structural support members include a plurality of angled support members angled relative to said transverse direction; and
said plurality of structural support members include at least one tensile support member extending substantially parallel to said transverse direction;
said filter media interposed between said frame front surface and said frame rear surface.

2. The air filter of claim 1 wherein said plurality of structural support members includes at least one tensile support member extending substantially parallel to said machine direction.

3. The air filter of claim 1 further comprising a media backing structure interposed between said filter media and said frame.

4. The air filter of claim 1 wherein said frame front surface overlaps said frame rear surface.

5. The air filter of claim 1 wherein said frame rear surface overlaps said frame front surface.

6. The air filter of claim 1 wherein said filter media is substantially formed of polyester fibers.

7. The air filter of claim 1 wherein said filter media is substantially formed of polyethylene fibers.

8. The air filter of claim 1 wherein said frame is substantially constructed of cardboard.

9. An air filter, comprising:
a frame having a frame first side member and an opposing frame second side member interconnected with a frame top member and an opposing frame bottom member defining an inner perimeter, a front frame surface with a front frame surface opening, and a rear frame surface with a rear frame surface opening;
a pleated filter media having a stiffness of at least about 600 Gurley retained within said frame and a plurality of pleat valleys continuing substantially uninterrupted in a transverse direction from a pleated filter media top to a pleated filter media bottom, wherein said pleated filter media includes a pleat width in said transverse direction between said pleated filter media top and said pleated filter media bottom;

said frame having a length in said transverse direction across said inner perimeter defining an inner-frame width in said transverse direction between said frame top member and said opposing frame bottom member;

wherein said pleat width is greater than said inner-frame width in said transverse direction;

wherein at least one of said front frame surface and said rear frame surface has at least one tensile support member and a plurality of angled support members;

said tensile support member extending substantially parallel to said transverse direction across an air flow opening;

said plurality of angled support members angled substantially equally relative to said tensile support member.

10. The air filter of claim 9 further comprising a media backing structure interposed between said pleated filter media and said frame.

11. The air filter of claim 9 wherein said frame front surface overlaps said frame rear surface.

12. The air filter of claim 9 wherein said frame rear surface overlaps said frame front surface.

13. The air filter of claim 9 wherein said pleated filter media is substantially formed of polyester fibers.

14. The air filter of claim 9 wherein said pleated filter media is substantially formed of polyethylene fibers.

15. The air filter of claim 9 wherein said frame is substantially constructed of cardboard.

16. A method for assembling an air filter having a transverse direction transverse to a machine direction, comprising the steps of:

providing a frame rear having an outer perimeter of frame members forming a closed shape, wherein said frame rear further comprises a plurality of angled support members and one or more tensile support members;

providing a frame front having an outer perimeter of frame members forming a closed shape;

applying an adhesive to said frame rear;

inserting a filter media having a stiffness of at least about 600 Gurley into said frame rear, thereby placing said filter media in contact with said adhesive of said frame rear, wherein said filter media is oversized in a transverse direction relative to said outer perimeter of said frame members of one or more of said frame rear and said frame front;

placing one or more of said frame rear and frame front in tension by stretching at least one of said frame rear and said frame front until substantially dimensionally equivalent in said transverse direction to said oversized filter media; and attaching one or more attachment members of said frame front to one or more attachment members of said frame rear, thereby framing said filter media.

17. The method of claim 16 wherein said frame front further comprises one or more tensile support members and a plurality of angled support members angled relative to said one or more tensile support members.

18. The method of claim 16 further comprising the step of providing a media backing structure interposed between said filter media and said frame.

19. The air filter of claim 2 wherein said at least one tensile support member extending substantially parallel to said transverse direction is equidistantly spaced from said frame first side member and said frame second side member and said at least one tensile support member extending substantially parallel to said machine direction is equidistantly spaced from said frame top member and said frame bottom member.

20. The air filter of claim 9 wherein said at least one of said front frame surface and said rear frame surface includes another at least one of said tensile support member extending substantially perpendicular to said transverse direction across said air flow opening.

* * * * *

UNITED STATES PATENT AND TRADEMARK OFFICE
CERTIFICATE OF CORRECTION

| | | |
|---|---|---|
| PATENT NO. | : 8,992,650 B2 | Page 1 of 1 |
| APPLICATION NO. | : 13/656488 | |
| DATED | : March 31, 2015 | |
| INVENTOR(S) | : M. Aflal Rahmathullah et al. | |

It is certified that error appears in the above-identified patent and that said Letters Patent is hereby corrected as shown below:

Specification

Column 4, Line 48: replace "frame bottom 144" with --frame bottom member 114--

Column 7, Line 12: replace "frame 130" with --frame 105--

Column 8, Line 38: delete "are" after "that"

Signed and Sealed this
Nineteenth Day of January, 2016

Michelle K. Lee
*Director of the United States Patent and Trademark Office*